United States Patent

[11] 3,604,004

[72] Inventor Edward M. Buyer
74 Oak Road, Bayport, N.Y. 11705
[21] Appl. No. 797,870
[22] Filed Feb. 10, 1969
[45] Patented Sept. 7, 1971

[54] DUAL FREQUENCY RADIO APPARATUS FOR DATA TRANSMISSION AND DIRECTION FINDING
6 Claims, 2 Drawing Figs.

[52] U.S. Cl. 343/113, 325/301, 325/307
[51] Int. Cl. G01s 3/04
[50] Field of Search 343/101, 102, 113, 176; 325/9, 301, 307

[56] References Cited
UNITED STATES PATENTS

| | | | |
|---|---|---|---|
| 2,700,753 | 1/1955 | Peterson | 343/176 X |
| 3,098,971 | 7/1963 | Richardson | 325/9 |

*Primary Examiner*—Rodney D. Bennett, Jr.
*Assistant Examiner*—Richard E. Berger
*Attorney*—Henry Huff

ABSTRACT: A system for radio direction finding on a transmitter station that sends information or data as modulation on a carrier of a frequency unsuitable for direction finding, by utilizing a higher frequency beacon signal derived from and frequency locked to the data transmission.

INVENTOR.
EDWARD M. BUYER
BY [signature]
ATTORNEY.

DUAL FREQUENCY RADIO APPARATUS FOR DATA TRANSMISSION AND DIRECTION FINDING

BACKGROUND OF THE INVENTION

1. Field

This invention pertains to simultaneous dual-frequency radio-signalling apparatus, particularly adapted to provide improvements in the art of determining the directions of low-power cooperative radio transmitter stations which may be ephemeral and subject to frequency instability and multipath propagation effects.

2. Prior Art

The use of radio beacons as cooperative targets for direction finding is known. It is also known to use a special pilot signal for alignment of a highly directive communications receiver antenna, as in radio relay and satellite communications systems. These expedients are generally restricted to relatively complex systems, where it is technically and economically practical to provide and operate the necessary additional equipment. Heretofore they have not been feasible for use with simple low-power transmitters that operate at unfavorable frequencies. Ordinarily such transmitters are located by homing on them with a mobile radio direction finder, which must be physically carried eventually to a point in the neighborhood of the transmitter. This method is slow and cumbersome, and unworkable for locating a large number of different transmitters within a short time, or transmitters that cannot be closely approached.

SUMMARY

According to this invention, a transmitter station that sends data as frequency modulation on a carrier frequency suitable for that purpose, but not suitable for direction finding, is arranged to radiate a harmonic of the data signal with sufficient strength to serve as a beacon signal. A receiver station with data signal receiver is also provided with a beacon signal direction-finder receiver. The beacon receiver is similar to a superheterodyne, including a mixer and IF amplifier, but the heterodyne reference signal that conventionally would be supplied by a local oscillator is derived instead from the received data signal by frequency conversion and multiplication.

The frequency difference between the heterodyne reference signal and the beacon signal is essentially constant, independent of modulation or frequency drift of the data transmitter. Accordingly, the output of the beacon receiver mixer is constant frequency IF, adapted to narrow band amplification and concomitant discrimination against noise.

As a result of the favorable signal-to-noise characteristic of the beacon receiver, and the use of a suitable beacon signal frequency, the target transmitter station needs to radiate only about one percent as much power in the beacon signal as it does in the data signal, to enable dependable directional bearings to be obtained at convenient ranges. Thus it becomes practical to obtain the energy for the beacon transmitter signal parasitically from the data transmitter R–F signal, avoiding need for an additional source of primary power at the transmitter station or extensive internal modification of existing data transmitter systems.

Drawing

FIG. 1 of the drawing is a block diagram of a transmitter-receiver system illustrative of one of the presently preferred embodiments of the invention, and FIG. 2 is a block diagram of a modification of part of the receiver system of FIG. 1, particularly adaptable for selective use with a plurality of data transmissions on respective carriers of different frequencies.

DESCRIPTION OF THE PREFERRED EMBODIMENTS

Figure 1:
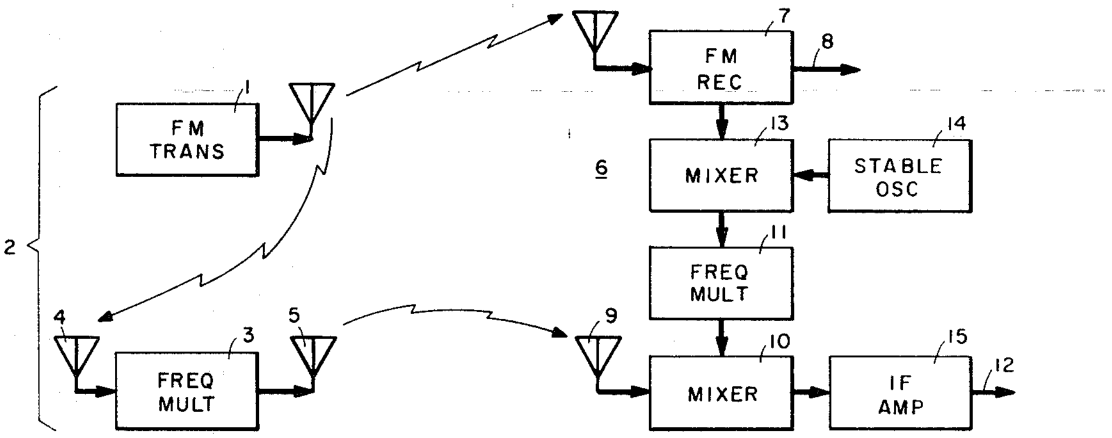

Referring to FIG. 1, a transmitter 1 is arranged to transmit data, for example locally sensed seismic information, as frequency modulation on a radio frequency carrier. It is assumed that the carrier frequency has been chosen on the basis of considerations relating to effective communication of the data over a desired range using a relatively low transmitter power, of the order of one to several watts. As a specific example, the nominal frequency of the carrier may be 162 MHz.

The entire transmitter station, denoted generally by the reference 2, may be a disposable device, battery-powered and adapted to be placed as by airdrop at some approximate location for temporary operation, and then abandoned. To provide a beacon signal for precise radio direction finding, the transmitter station is arranged to radiate a harmonic, for example the sixth, of the VHF data signal.

It is within the contemplation of this invention that the transmitter 1 may be specially designed to accentuate the desired harmonic in its output. However, internal modification of preexisting transmitters may be impractical. Accordingly, in the illustrated embodiment of the invention, the transmitter 1 is provided with an external attachment comprising a frequency multiplier 3, a pickup 4 adapted to absorb some of the RF output of the transmitter 1, and a radiator 5 for the output of frequency multiplier.

The multiplier 3 may be of the type using a step recovery diode, described by Stephen Hamilton and Robert Hall on pages 69–78 of the Apr. 1967 issue of Microwave Journal, published by Horizon House, Dedham, Massachusetts. Such devices, designed for six times multiplication, typically have a power efficiency of about 10 percent. The pickup 4 is so coupled to the data transmitter 1 as to absorb about 10 percent of its RF output, reducing its effective range by only a small amount. The sixth harmonic power radiated by the radiator 5 is about 1 percent of the fundamental power output of the data transmitter 1.

At a receiver station 6, which may be fixed or mobile, a receiver 7 is provided to respond to the data signal from the transmitter 1 and reproduce the data modulation at an output lead 8 for application to utilization means such as a recorder or display device, not shown. The receiver station is also provided with a direction finder system comprising a directive antenna 9 and a special receiver for operation with the harmonic beacon signal from the transmitter station 2.

The antenna 9 may be a suitable directive array of known type. In the event that its operation requires multiple receiver channels such as left-right or sum and difference, certain portions of the single channel receiver depicted in FIG. 1 may be duplicated as necessary.

The direction finder receiver includes a mixer or first detector stage 10 with one input coupled to the antenna 9 and another to a frequency multiplier 11. The output of the mixer 10 is applied to an IF amplifier 15, which is in turn connected by way of an output lead 12 to the first of a cascade of subsequent conventional receiver stages and final utilization means, not shown because they may be of any appropriate known design, and their details form no part of this invention.

Another mixer 13 has one input connected to a stable oscillator 14 and the other to a point in the receiver 7 where a suitable RF or IF signal voltage is available, as will be described later. The output of the mixer 13 is applied to the frequency multiplier 11. The mixers 10 and 13 are of conventional design, and include usual means for suppressing the output of all except one of the modulation products, say the difference frequency component. The frequency multiplier 11 may be of the same type as the multiplier 3, and is designed to multiply by the same factor.

For initial explanation, it is assumed that the mixer 13 is connected to an RF circuit in the receiver 7, that is, to a point ahead of any frequency converter means. The oscillator 14 is crystal controlled at a frequency of 10 MHz. The IF amplifier 15 is designed to have a pass band of 10 kHz., centered at 60 mHz.

In typical operation of the system, the transmitter 1 is frequency modulated by a data signal lying within a base band that extends up to about 1 kHz. The peak frequency deviation due to the modulation is ±50 kHz. The transmitter 1 may also exhibit a more or less random carrier frequency drift of up to about 25 kHz. from its nominal 162 MHz. Thus the instantaneous frequency $f$ radiated from the transmitter 1 and received by the receiver 7 may be anywhere in the band of 162 MHz ±75 kHz. The instantaneous frequency of the signal radiated from antenna 5 and received at antenna 9 is exactly $6f$.

At the receiving station 6, the receiver 7 provides an input of frequency $f$ to the mixer 13, and the mixer 13 produces an output of frequency $f$–10 MHz. The resulting output of the multiplier 11 has an instantaneous frequency of $6f$–60 MHz. This combines in the mixer 10 with the signal of frequency $6f$ received by the antenna 9 to produce an output signal of the difference frequency, $6f-(6f-60$ MHz$)=60$ MHz. The frequency of the input to the IF amplifier 15 is essentially constant at 60 MHz, its stability being determined solely by that of the oscillator 14, and is independent of $f$.

Directional information is represented in known manner by the amplitude of the output of the IF amplifier 15. Owing to the frequency stability of this output, the means for processing and utilizing it may be designed to operate with extremely narrow bandwidth, affording discrimination against radio interference such as random noise and enabling the use of relatively low-power beacon transmission from the transmitter station 2.

Transmitters such as the transmitter 1 are often designed to send several different data signals simultaneously on respective carrier frequencies, each allocated to a different but nearby channel of, say 300 kHz. bandwidth. Further, it is quite possible that a number of transmitter stations like station 1 but operating on different channels will be within range of a single receiving station like station 6 at the same time. Accordingly, the receiver 7 must be selectively tunable to each of, for example 30 channels. To avoid the need for separate tuning controls for the data and beacon receivers, and for other practical reasons concerning circuit design, the arrangement of FIG. 2 is presently preferred for selective channel operation.

Figure 2:
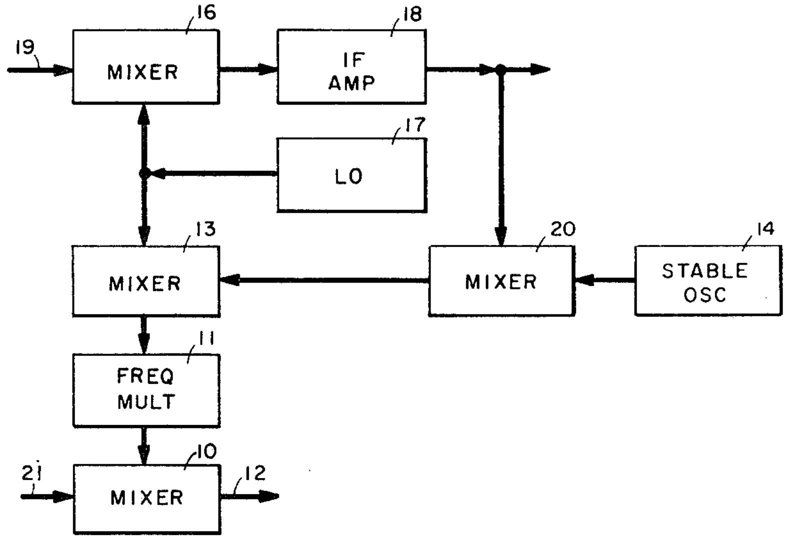

Referring to FIG. 2, the data receiver, corresponding to the receiver 7 of FIG. 1, includes a mixer 16, a local oscillator 17, and an IF amplifier 18. The mixer 16 is designed to accept, as RF input on lead 19, all frequencies within a band that covers the channels of interest, for example from 162 MHz to 175 MHz. The pass band of the IF amplifier 18 may be centered at 26 MHz, and of sufficient width to accommodate the maximum frequency deviations expected to result from modulation and drift. The local oscillator is tunable, preferably in a discrete manner as by selection of appropriate frequency control crystals, to any one of a number of frequencies, each differing from the center of a respective data channel by 26 MHz.

The beacon receiver part of the system of FIG. 2 includes the mixers 10 and 13 and frequency multiplier 11, connected and operating as already described. In this case, the mixer 13 is designed to produce the sum, instead of the difference frequency as output, and the mixer 10 is designed to accept, as RF input on lead 21, all frequencies within a band that covers the sixth harmonic of the beacon frequencies of interest, for example from 972 MHz to 1050 MHz. One input of the mixer 13 is connected to the local oscillator 17, and the other to a further mixer 20. The inputs of the mixer 20 are supplied by the IF amplifier 18 and the oscillator 14.

In the operation of the system of FIG. 2, the frequency of the local oscillator is adjusted or set according to the data channel to be selected. For example, suppose the desired data channel is centered at 165 MHz. The local oscillator frequency is 139 MHz, and the difference frequency is the IF, 26 MHz. The amplified output of the IF amplifier 18, carrying the same modulation as the selected 165 MHz data carrier, goes on to subsequent stages (not shown) of the data receiver and also to the mixer 20. The difference frequency output of the mixer 20 is a 16 MHz carrier, also modulated with the data. This is mixed in mixer 13 with the local oscillator, producing an output, still carrying the data modulation, on the sum frequency 139+16, 155 MHz.

The 155 MHz signal is frequency multiplied by the multiplier 11, providing an input at 930 MHz to the mixer 10. This beats with the sixth harmonic of the selected data signal, which has a frequency of 990 MHz, to provide a difference frequency output at the beacon IF, 60 MHz. As in the system of FIG. 1, this signal is free of frequency modulation and drift, with its stability determined by that of the oscillator 14.

Any change in the frequency of the local oscillator 17, whether intentional, for channel selection, or unintentional, due to drift, is cancelled by the frequency additive operation of mixer 13 opposing the subtractive operation of mixer 16. Thus the beacon receiver is always automatically locked on the sixth harmonic of any data signal frequency selected by setting the local oscillator 17.

I claim:

1. A radio-signalling system comprising:
   a. a transmitter station including means for simultaneously transmitting a modulated fundamental signal and a beacon signal which is a harmonic of said fundamental signal,
   b. a receiving station including a data receiver adapted to receive said fundamental signal for utilization of the information represented by said modulation, said data having a pass band wide enough to accommodate said modulation,
   c. said receiving station further including a beacon receiver adapted to receive said beacon signal, said beacon receiver including a mixer and I–F amplifier having a pass band substantially narrower than that of said data receiver, and
   d. frequency changing means responsive to the signal received by said data receiver to produce a heterodyne reference signal for the mixer of said beacon receiver.

2. A radio direction-finding system for use in the location of transmitter stations which transmit data on a frequency that is lower than optimum for accurate direction finding, comprising:
   a. a radio beacon device adapted to be placed at a transmitter station and including pickup means for absorbing a portion of the relatively low-frequency transmitter output,
   b. said beacon device further including a frequency changer device connected to said pickup means and energized solely by the power absorbed thereby to produce output of a higher frequency more suitable for radio direction finding, and means for radiating said higher frequency output,
   c. a receiving station including a data receiver for receiving the relatively low-frequency data transmission,
   d. said receiving station further including a direction-finding receiver for receiving said relatively higher frequency beacon transmission, said direction finding receiver including a mixer and a narrow band I–F amplifier, and
   e. means responsive to the signal received by said data receiver for producing a heterodyne reference signal for the mixer of said direction-finding receiver.

3. A radio receiver system for use with a transmitter system that simultaneously transmits a fundamental signal subject to frequency variations and a harmonic of said signal, comprising:
   a. a receiver adapted to receive said fundamental signal, said fundamental receiver having a pass band wide enough to accommodate said frequency variations,
   b. a receiver adapted to receive said harmonic, said harmonic receiver including a frequency converter and a narrow band I–F amplifier, and
   c. frequency changing means responsive to the signal received by said fundamental receiver to produce a heterodyne reference signal for the frequency converter of said harmonic receiver, said heterodyne reference signal carrying the same frequency variations as said harmonic, whereby the output of said I–F amplifier of said harmonic receiver is an essentially constant frequency continuous wave signal suitable for narrow band processing and utilization.

4. A radio direction finding receiver system for use with a transmitter system that simultaneously transmits a frequency-modulated fundamental signal and a harmonic of said signal, comprising:

a. a data receiver adapted to receive said fundamental signal for utilization of the information represented by said modulation, said data receiver having a pass band wide enough to accommodate said frequency modulation, b. a direction finder including a directional antenna and a receiver adapted to receive said harmonic, said direction finder receiver including a frequency converter and an I–F amplifier having a pass band substantially narrower than that of said data receiver, and c. frequency-changing means responsive to the signal received by said data receiver to produce a heterodyne reference signal for the frequency converter of said direction finder receiver, said heterodyne reference signal carrying the same frequency modulation as said harmonic, whereby the output of said I–F amplifier of said direction finder receiver is an essentially constant frequency continuous wave signal suitable for narrow band processing and utilization.

5. The invention set forth in claim 4, wherein said data receiver is of the superheterodyne type including an adjustable frequency local oscillator and an I–F amplifier, and said last-mentioned frequency changing means includes a stable fixed frequency oscillator, a first mixer connected to receive the output of said I–F amplifier and that of said fixed frequency oscillator, a second mixer connected to receive the output of said first mixer and that of said local oscillator, and a frequency multiplier for producing a harmonic of the output of said second mixer.

6. The invention set forth in claim 4, wherein said last-mentioned frequency-changing means includes a stable oscillator and a mixer for producing a signal like said received data signal but offset in frequency therefrom by a fixed amount, and a frequency multiplier for producing a harmonic of said frequency-offset signal.

UNITED STATES PATENT OFFICE

CERTIFICATE OF CORRECTION

Patent No. 3,604,004 Dated September 7, 1971

Inventor(s) Edward M. Buyer

It is certified that error appears in the above-identified patent and that said Letters Patent are hereby corrected as shown below:

Abstract page, column 1, following line designated (45) insert -- Assignee Cutler-Hammer, Inc. Milwaukee, Wisconsin --.

Signed and sealed this 28th day of March 1972.

(SEAL)
Attest:

EDWARD M.FLETCHER,JR.
Attesting Officer

ROBERT GOTTSCHALK
Commissioner of Patents

M PO-1050 (10-69)

USCOMM-DC 60376-P69
☆ U.S. GOVERNMENT PRINTING OFFICE : 1969 O—366-334